United States Patent [19]
Hentzschel

[11] 3,765,940
[45] Oct. 16, 1973

[54] VACUUM EVAPORATED THIN FILM RESISTORS

[75] Inventor: Hanspeter P. K. Hentzschel, Reutlingen, Germany

[73] Assignee: Texas Instruments Incorporated, Dallas, Tex.

[22] Filed: Nov. 8, 1971

[21] Appl. No.: 196,681

[52] U.S. Cl. ............. 117/227, 117/201, 117/106 A, 117/106 R, 29/620, 204/192, 148/175
[51] Int. Cl. ............................ B44d 1/02, H01l 7/36
[58] Field of Search ................ 117/227, 201, 106 A, 117/106 R; 29/620; 204/192; 148/174, 175, 180

[56] References Cited

UNITED STATES PATENTS

| | | | |
|---|---|---|---|
| 3,418,181 | 12/1968 | Robinson | 148/187 |
| 3,567,509 | 3/1971 | Kuiper | 117/227 |
| 3,620,837 | 11/1971 | Leff | 117/227 |
| 3,660,180 | 5/1972 | Wajda | 117/106 A |
| 3,664,893 | 5/1972 | Frazee | 148/175 |

*Primary Examiner*—Alfred L. Leavitt
*Assistant Examiner*—M. F. Esposito
*Attorney*—Harold Levine et al.

[57] ABSTRACT

A thin film resistor is fabricated by coevaporating or codepositing semiconductor material selected from Group IV of the Periodic Table such as, for example, silicon and germanium and a doping material of electrical conductivity modifier such as aluminum, boron, antimony, or arsenic, for example, to form a thin film on an insulating substrate. The substrate may be formed from a material such as ceramic, glass, plastics, and either silicon or germanium if the silicon and germanium is provided with an insulating oxide layer. The amount of dopant in the thin film layer exceeds the solid-solubility limits of the dopant in the semiconductor material. The thin film is then crystallized by annealing to bring the thin film to an increased and stable conductivity state and the sheet resistivity measured. Thereafter the thin film is further annealed to oxidize the metal to produce a desired sheet resistance.

10 Claims, 3 Drawing Figures

VACUUM EVAPORATED THIN FILM RESISTORS

BACKGROUND OF THE INVENTION

1. Field of the Invention

This invention relates to thin film resistors, and more particularly to semiconductor material — metal films and monolithic circuits.

2. Description of Prior Art

In the past many types of thin film resistors have been investigated. The types have been classed as metals, alloys, metal on oxide, metal oxide and silicon-metal. Within these classes there are only a few examples capable for use in monolithic circuits and problems are generally associated with each one used. A few examples are set forth to demonstrate problems encountered. Tantalum of the metal class has been used, but it has a high temperature stability problem. Chromium-lead glass of the metal on oxide class has been used also, but very limited data exists as to its reliability. Chromium-silicon oxide of the metal oxide class has also been used, but it requires the use of double metal evaporation techniques which are costly and difficult to control. Silicon-chromium of the silicon-metal class deposited by dc sputtering techniques shows promise for stable, high-sheet resistivity resistors in monolithic circuits. The silicon-chromium example of the silicon-metal class when deposited by dc sputtering has a resistance of $10^{-3}$ to $10^{-2}$ ohms centimeter. A resistivity (specific resistance or sheet resistivity) of 1 to 20,000 ohms per square, and 300 to 600 parts per million per degree centigrade temperature coefficient of resistance. These properties make the silicon-chromium the best of the classes. However, the principal problems of thin film resistors of the silicon-metal class are the difficulty of reproducing a certain resistor value over 10 kilohms per square.

SUMMARY OF THE INVENTION

It is an object of this invention to provide an improved thin film resistor.

It is another object of this invention to provide a method for producing thin film resistors having desired resistor values.

It is still another object of this invention to provide a method for producing thin film resistors having desired stability under thermal stress.

It is a further object of this invention to provide a method for producing thin film resistors having reproducable values and stability under thermal stress.

Yet another object of this invention is to provide a thin film resistor of desired value and stability under thermal stress.

It has been found that while the resistance of germanium, for example, drops from 50 ohm centimeters to $5 \times 10^{-4}$ ohm centimeters (5 orders of magnitude) by addition of 0.94 atomic weight percent aluminum ($\approx$ .5 weight percent al), excess of aluminum over the limits of solid solubility will only slightly decrease the specific resistance. This behavior allows the use of excess aluminum (dopant) for control of the specific resistance of the film; thus, practically eliminating the influence of the concentration of the dope. Thus, briefly stated, this invention comprises fabricating thin film resistive devices such as, for example, resistors by forming a thin film of a semiconductor material and a doping material simultaneously on a sheet of insulating substrate material. The amount of doping material exceeds slightly the solid-solubility limits of the dopant in the semiconductor material so that subsequent annealing will relocate the dopant within the structure and allow additional crystallization of the semiconductor material to increase substantially the conductivity and to stabilize significantly the conductivity at this increased level. The sheet resistivity is measured to determine the specific resistivity of the thin film and the film is further annealed to adjust the thin film to a desired resistivity.

BRIEF DESCRIPTION OF THE DRAWINGS

A detailed description of the preferred embodiment of this invention follows with reference being made to the drawings wherein like parts have been given like reference numerals for clarity and understanding of the elements and features of the invention.

Referring to FIG. 1, wherein there is shown a bent-beam type electron gun semiconductor material evaporating apparatus 10 used to fabricate a thin resistive film 12. It will be understood of course that the thin resistive film 12 may be fabricated using other evaporating or sputtering apparatus such as, for example, electron gun, dc sputtering or rf sputtering equipment provided a material of the charge carrying member does not react with the semiconductor material. The thickness of the thin film 12 deposited may be controlled by the use of a crystal oscillator 13 in which perturbation of the crystal's resonant frequency is measured and related to the deposited film thickness. The apparatus has a vacuum chamber 14 in which is positioned a substrate support member 16 above a charge carrying member 18. At least one electron gun 20 is positioned adjacent the side of the charge carrying member 18 and a magnetic field-producing system including, for example, an electromagnet or permanent magnet 22 is positioned to deflect an electron beam produced by the electron gun 20 toward the charge 26.

Figures 1, 2, 3:
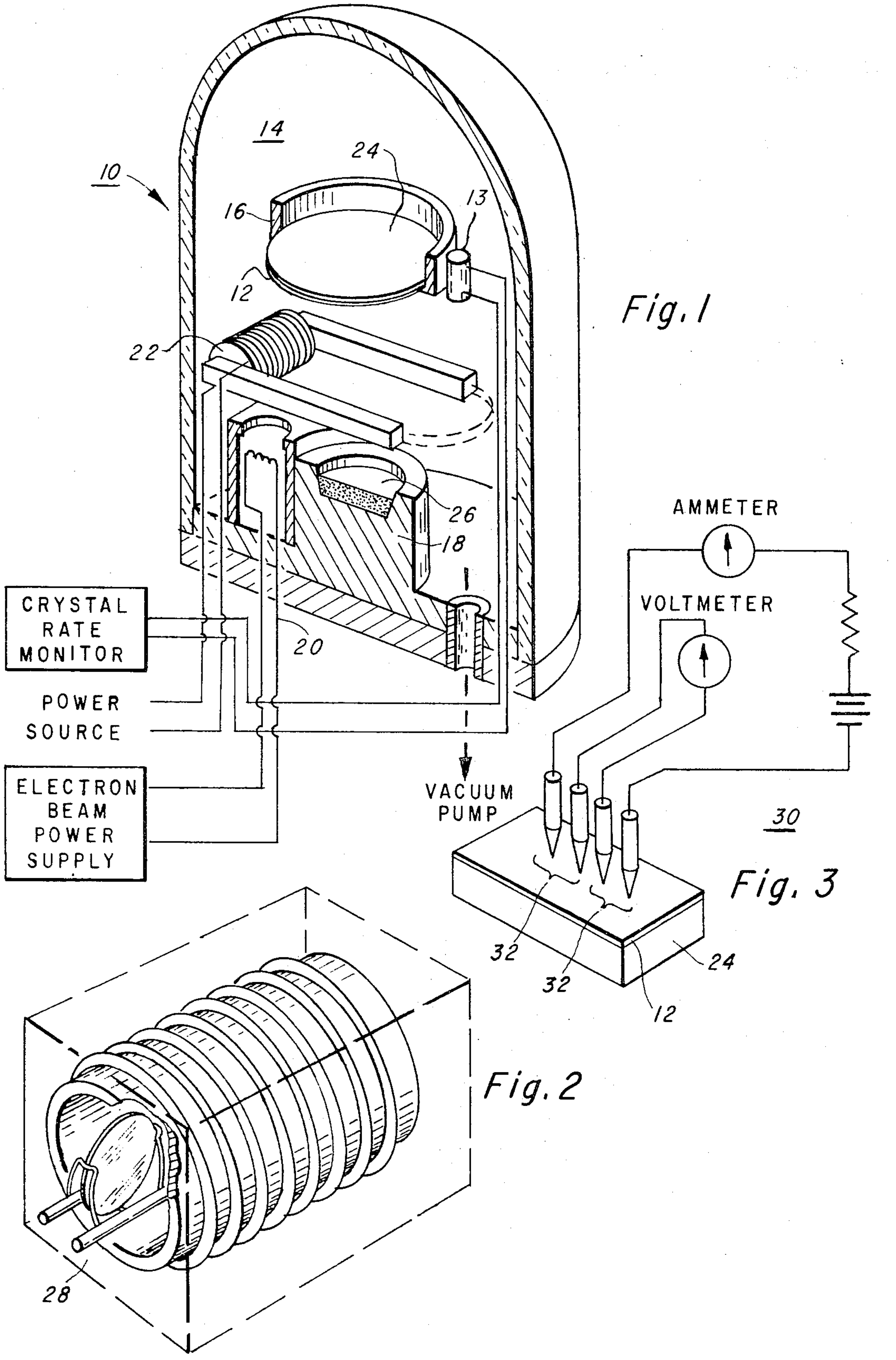
FIG. 1 is a cross sectional view drawn in perspective of an electron beam apparatus for depositing the thin film material on the substrate sheet.
FIG. 2 is a perspective view of an air bake oven for baking the thin film to an initial and final specific resistance resistivity value.
FIG. 3 is a diagrammatic view of the thin film resistor and the four point probe used to measure the specific resistivity.

To fabricate the thin resistive film 12, a sheet of suitable insulating substrate material 24 (FIG. 1) is carried by the substrate support member 16. The substrate material 24 may be, for example, ceramic, glass, a high temperature resisting plastic, and either silicon or germanium provided the silicon or germanium is provided with an insulating oxide coat or film. If a silicon or germanium substrate having an insulating oxide layer is used, the substrate may include either active or passive elements which have been formed therein prior to the fabrication of the thin resistive film 12. A doped body of semiconductor material 26 is carried as the charge by the charge carrying member 18. The doped semiconductor material 26 may be, for example, Group IV elements of the Periodic Table silicon or germanium; and the doping material may be, for example, a suitable conductor metal such as, for example, aluminum, boron, antimony, and arsenic. It will be understood that the semiconductor material and dopant may be evaporated from the combined or separate state, the only criterion being that the doped semiconductor material 26 deposited on the substrate sheet 24 have a concentration of dopant which exceeds within operative limits the limits of solid-solubility of the dopant in the semiconductor material. The upper operative limit has been found to be about $1 \times 10^{21}$ atoms per cubic centimeter. The solubility of aluminum in silicon is about $5 \times 10^{18}$ atoms per cubic centimeter at 500° C. and the solubility of aluminum in germanium is about $4 \times 10^{20}$ atoms per cubic centimeter at 550° C. With the substrate sheet 24 and the doped semiconductor material 26 in place and the crystal oscillator 13 set to detect the desired thin film thickness, the pressure of the vacuum chamber 14 is reduced to between $10^{-5}$ to $10^{-8}$ torr. The electron gun 20 and electromagnetic field producing system is activated and electrons generated by the electron gun are deflected by the magnetic field to impinge upon the doped semiconductor material 26. The action of the electrons evaporates the doped semiconductor material to form a doped thin film 12 on substrate 24 in which the solid-solubility limits of the dopant in the semiconductor material is slightly exceeded. It will be understood that when the charge 26 is in the combined state the concentration of dopant to semiconductor material and the rate of evaporation must be such that the probability of molecules of dopant escaping from the surface along with the molecules of semiconductor material will produce the desired thin film. A charge of semiconductor material containing 1 percent by weight dopant is preferred. After the thin film 12 reaches the desired thickness on the substrate material 24 the electron gun is deactivated and the substrate 24 bearing the thin film 12 is removed from the vacuum chamber 14 and placed into an air bake oven 28(FIG. 2) where it is annealed by baking for 10 to 30 minutes at temperatures below 600° C. with a temperature of 550° C. preferred. This treatment causes the aluminum to relocate within the structure of the thin film 12 and the structure to further crystallize to increase substantially the conductivity and to stabilize significantly the conductivity at this increased level. The substrate 24 bearing the thin film is then removed from the oven and the resistivity measured using the four-point probe method shown in FIG. 3.

The apparatus of the four-point probe consists of a probe 30 with four-metal points 32 arranged in a straight line in one end. A conductor 34 connects each metal point 32 to an external circuit 36. To measure the resistivity of a sample at a particular spot, the probe 30 is set down on the sample at that spot with all four points 32 making contact with the surface of the semiconductor sample. Current is supplied to the sample through the two outer points 32 while the voltage is measured between the two inner points. The resistance of the material in the vicinity of the probe is then equal to the measured voltage divided by the measured current ($R = V/I$). The resistivity is then determined by the equation $\rho = RA/L$ where A and L represent the cross-sectional area and length of the path taken by the current between the points 32.

Typical values of sheet-resistance, thickness and specific resistance of aluminum-doped germanium is shown in TABLE I and of aluminum-doped silicon is shown in TABLE II.

TABLE I — GERMANIUM

| Sheet Resistance Ω per square | Specific Resistance m Ω cm | Thickness A° |
|---|---|---|
| 30 | 0.4 | 1250 |
| 60 | 0.5 | 875 |
| 120 | 0.7 | 600 |
| 200 | 1.0 | 500 |
| 420 | 1.6 | 375 |
| 660 | 2.8 | 425 |
| 860 | 2.6 | 300 |
| 900 | 3.2 | 350 |
| 1600 | 4.2 | 260 |
| 2400 | 7.0 | 290 |

TABLE II — SILICON

| Sheet Resistance Ω per square | Specific Resistance m Ω cm | Thickness A° |
|---|---|---|
| 1500 | 45 | 3000 |
| 2500 | 33 | 1300 |
| 2700 | 35 | 1300 |
| 4300 | 43 | 1000 |
| 8300 | 66 | 800 |
| 18800 | 94 | 500 |

After the resistivity has been measured the substrate 24 bearing the doped thin film 12 is returned to the air bake oven 28 and further annealed at a temperature below 550° C. to adjust the sheet resistance to a desired value. TABLE III shows that the films are extremely stable during processing and at 450° C. air bakes.

TABLE III

BAKE OF DOPED Ge AND Si-FILM AT 450°C IN AIR

| TIME (Min) | Ge (Ω per square) | Si (Ω per square) |
|---|---|---|
| | 59.3 | 7900 |
| 20 | 58.0 | 7930 |
| 30 | 57.8 | 7960 |
| 90 | 57.6 | 8350 |
| 150 | 58.8 | 8100 |
| 210 | 58.4 | 8350 |

Although the preferred embodiment of this invention has been described it will be apparent to a person skilled in the art that various modifications to the details of the method of construction shown and described may be made without departing from the scope of this invention.

What is claimed is:

1. A method for producing a thin film resistive device comprising depositing on a substrate a layer of a mixture of semiconductor material and a dopant material, the amount of said dopant in said layer being in excess of the solid solubility limits of the dopant in the deposited semiconductor material but less than about $10^{21}$ atoms/cubic centimeter of semiconductor material; and thereafter annealing said thin film at a temperature of less than about 600° C. to adjust said film to a desired resistivity.

2. A method according to claim 1 wherein the step of annealing said thin film to a desired resistivity includes a first annealing stage at a temperature of about 550° C. to relocate the dopant within the structure of the layer of doped semiconductor material to increase substantially the conductivity of said layer and to stabilize significantly the conductivity of the layer at this increased level; and a second annealing stage at a temperature below about 550° C. wherein the sheet resistance is adjusted to a desired resistivity.

3. A method according to claim 1 wherein said semiconductor materials are taken from the Group consisting of germanium and silicon.

4. A method according to claim 1 wherein the dopants are taken from the Group consisting of aluminum, boron, antimony, and arsenic.

5. A method according to claim 1 wherein the doped semiconductor materials are deposited by an evaporation process.

6. A method according to claim 1 wherein the doped semiconductor material is deposited using a sputtering process.

7. A method according to claim 1 wherein the doped semiconductor material is deposited using vacuum techniques.

8. The method according to claim 2 wherein said dopant is aluminum and said semiconductor is selected from silicon and germanium and said second annealing stage is at a temperature of about 450° C.

9. A method according to claim 1 wherein the thin film is silicon doped with aluminum annealed at 500° C. for about 10 to about 30 minutes.

10. A method according to claim 1 wherein said thin film is a germanium aluminum doped film annealed at a temperature of about 550° C. for about 10 to about 30 minutes.

* * * * *